July 21, 1970 L. J. POOLE ET AL 3,521,295

HIGH DENSITY MULTIHEAD RECORDING DEVICE

Filed April 18, 1967 2 Sheets-Sheet 1

Inventors
LESLIE J. POOLE
JOHN B. COTTRILL
By [signature]
Attorney

HIGH DENSITY MULTIHEAD RECORDING DEVICE

Filed April 18, 1967 2 Sheets-Sheet 2

Inventors
LESLIE J. POOLE
JOHN B. COTTRILL
By [signature]
Attorney

United States Patent Office 3,521,295

Patented July 21, 1970

3,521,295

HIGH DENSITY MULTIHEAD RECORDING DEVICE

Leslie John Poole, Potters Bar, and John Bernard Cottrill, Harlow, England, assignors to International Standard Electric Corporation, New York, N.Y., a corporation of Delaware Filed Apr. 18, 1967, Ser. No. 631,696
Claims priority, application Great Britain, May 31, 1966, 24,191/66
Int. Cl. G11b *5/20, 5/28, 5/42*
U.S. Cl. 346—74 3 Claims

ABSTRACT OF THE DISCLOSURE

An electro-magnetic recording device including a plurality of looped cores of magnetizable material and an energizing winding surrounding each core, the windings and cores being embedded in a non-magnetic support block. In addition, there is provided a method of making the device including the steps of winding the energizing windings on the cores, locating the free ends of the cores in a fixture, embedding the cores and windings in a non-magnetic material, and removing the locating member and the free ends of the cores, so that the core ends and the end turns of the windings are substantially flush with the surface of the non-magnetic material.

BACKGROUND OF THE INVENTION

This invention relates to an electro-magnetic recording device and a method of making such a device. The device has a particular application in the field of electro-magnetic printing.

The process of electro-magnetic printing comprises forming a magnetic image in a magnetizable recording surface, applying a magnetic powder material to the surface so that the powder adheres to the magnetic pattern or image only and then transferring the powder image to a sheet of paper or other print surface where it is permanently fixed in the form of a visible image.

The formation of the magnetic image is most conveniently carried out by building the image up from a matrix of magnetic dots. A single row of closely spaced very small magnetic recording gaps can be moved in steps across the recording medium and selectively energized at each step to build up a character or pattern.

It is another object of the present invention to provide an electro-magnetic recording device which may be used for recording magnetic patterns in the manner described above.

It is another object of the invention to provide a method of making electro-magnetic recording devices which may be used for recording magnetic patterns in the manner described above.

SUMMARY OF THE INVENTION

According to the invention there is provided an electro-magnetic recording device including a plurality of horseshoe-shaped or looped cores of magnetizable material, a plurality of energizing windings each surrounding a respective core in one to one correspondence, a support block of non-magnetic material in which the cores and windings are embedded, the support block having a recording surface adapted to be adjacent to a recording medium, the two ends of each core being flush with the recording surface and separated from each other by substantially the thickness of the windings only, the two end turns of each core winding being substantially flush with the recording surface of the block.

The invention also provides a method of making an electro-magnetic recording device, the method including the steps of winding an energizing winding along a central portion of a wire magnetic core member, locating the free ends of the core member in a pair of apertures in a locating member so that the end turns of the windings are abutting the locating member, the apertures being spaced so that the two ends of the core are separated from each other by substantially the thickness of the windings only, embedding the core in a body of non-magnetic material and removing the locating member and the free ends of the core so that the core ends and the end turns of the winding are substantially flush with the surface of the body so exposed, the ends of the winding being brought out to form electrical connections at a surface or surfaces of the body other than the surface at which the core ends are situated.

BRIEF DESCRIPTION OF THE DRAWINGS

In order that the above and other features of the invention may be more readily understood an embodiment thereof will now be described with reference to the accompanying drawings in which.

DESCRIPTION OF PREFERRED EMBODIMENT

Figure 1:
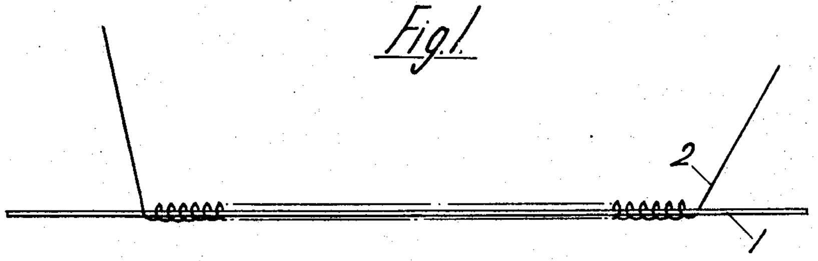
FIG. 1 illustrates a wound core.

The construction of a multi-gap recording head is basically the same as that of a single gap head. A piece of soft iron wire 1, FIG. 1, has a single insulated winding 2 wound thereon. The winding 2 must not have the turns thereof so tight together that flexing of the wire will damage the insulation on the wire. Next, a plate 3, FIG. 2 preferably of brass, has two holes 4, drilled in it, each hole being large enough to receive one end of the soft iron wire 1. The ends 5 of the wire 1 are pushed through the holes 4 and then pulled taut so that the two end turns of the winding 2 are pressed against the brass plate 3.

Figure 3:
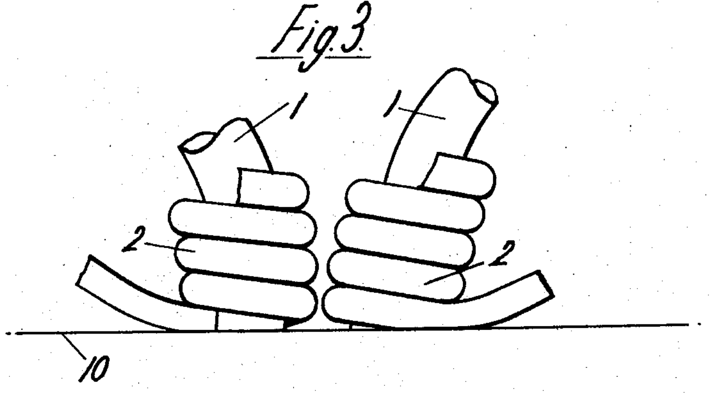
FIG. 3 illustrates in enlarged detail the magnetic recording gap provided by the construction of FIG. 2.

The ends 5 of the soft iron wire 1 are then bent over to anchor the core against the brass plate 3. Two side plates 6 carrying contact pins 7 are glued or otherwise fixed to the edges of the brass plate 3 and the ends 8 of the winding 2 are soldered to appropriate contact pins 7. After all the cores have thus been placed in position the space 9 is filled under vacuum with an epoxy resin potting compound. Finally the brass plate 3 is ground away to expose the surface of the solidified epoxy resin which now forms a solid body. The end turns of the winding 2 and the ends of the core 1 are now flush with the surface 10 of the body as shown in FIG. 3. In fact the grinding operation may even partially remove some of the end turns of the winding 2, as has been depicted in FIG. 3. Provided that the continuity of the winding is not broken the closer the end turns are brought to the surface, the better.

As an indication of the size of recording gap which can be obtained by this method, if the core wire 1 is 0.004 inch in diameter and the winding wire is 0.001 inch thick, then the two ends of the core can be spaced on approximately 0.006 inch pitch, centre to centre. Similarly adjacent cores in a multi-gap head can be spaced at intervals of 0.006 inch approximately.

Figure 4:
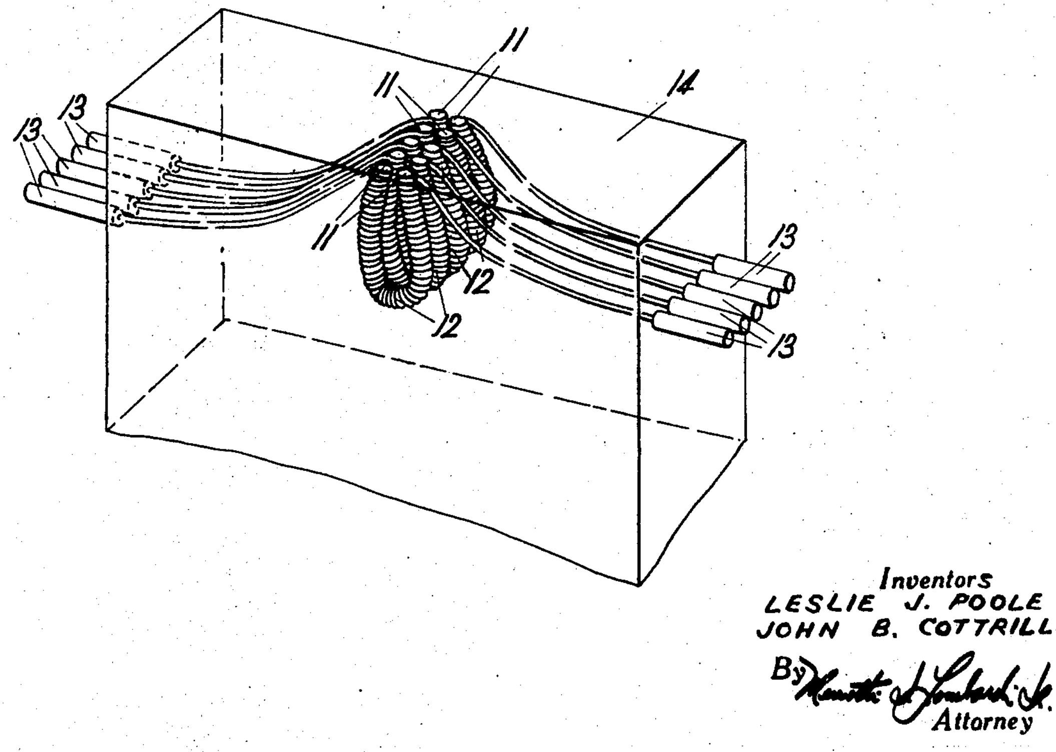
FIG. 4 is a perspective view of a finished recording head with five cores.

FIG. 4 shows a recording head having five cores 11 defining five gaps which can have the dimensions specified above. Each core winding 12 is terminated at contact pins 13 in the side of the body 14. It has been found that, even when the separate cores are virtually as close as the winding thickness will permit crosstalk between adjacent cores when one of then is energized is so small as to be negligible. The efficiency of each core is governed largely by the method of construction which allows each winding to be carried virtually to the pole tips.

The cores require low coercivity, high saturation magnetization and are not limited to soft iron. Other materials such as Radiometal, mild steel and Permendur are satisfactory, provided they are not too brittle to withstand the bending required to insert the core ends in the locating member.

While the head has so far been referred to in terms of electromagnetic printing only it will be appreciated that the head construction is also suitable for recording and/or replay heads for other electromagnetic recording processes, such as tape recording and magnetic drum storage.

Figure 2:
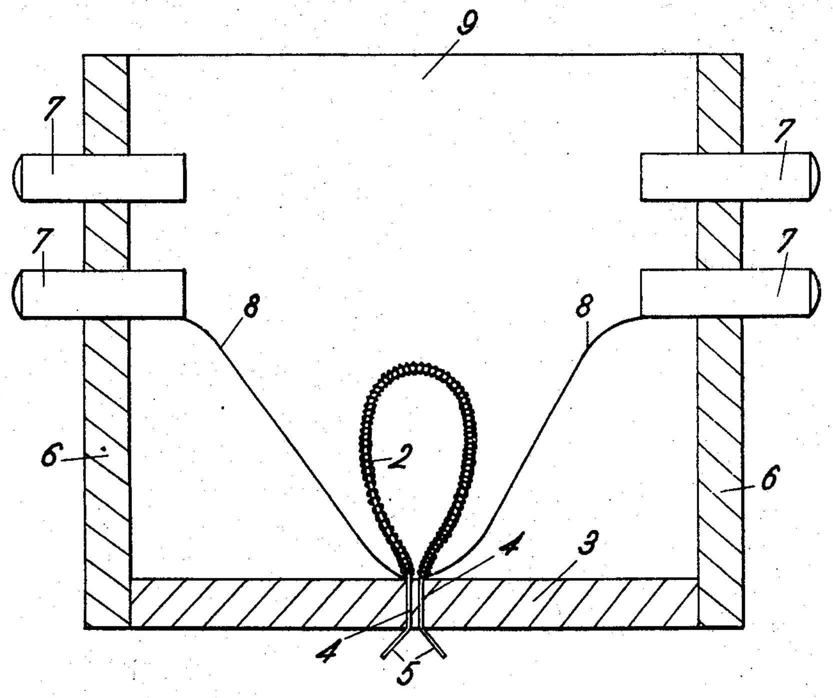
FIG. 2 illustrates the making of a recording head.

In the case of a head used for tape recording the removal of the brass plate 3, FIG. 2, can be performed in such a way that two raised side portions of the plate remain to act as tape guides.

Although for most applications potting of the cores in a plain epoxy resin compound is quite satisfactory it is possible to impregnate the compound with fillers such as amorphous silica to reduce wear of the recording surface. Alternatively airducts may be drilled or otherwise provided to enable the head to be supported and located on an air bearing if the circumstances permit. It will be appreciated that the problem of wear is important since the ends of the windings are located virtually at the surface of the head. Yet another method of combating wear is to leave the end turns of the windings exposed, as in FIG. 3, and to cover the recording surface with a replaceable film of wear resistant material which should not exceed 0.0005" in thickness. Materials which may be used include wear resistant plastic films. Alternatively the recording surface may have a film of material such as silicon nitride deposited thereon by a glow discharge process. Other potting compounds may be used where the properties of the potting compound may effect the performance of the head. For example, temperature considerations may call for the use of compounds other than epoxy resins.

What we claim is:

1. An electromagnetic recording device comprising:

(a) a block of non-magnetic material having a recording surface adjacent to a recording medium;

(b) a plurality of horseshoe-shaped cores of magnetizable material embedded in said block, each having its core ends separated by a gap of predetermined width and extending out to said adjacent surface to be flush therewith, said horseshoe-shaped cores being themselves spaced apart by said predetermined width in substantially parallel relationship with one another; and (c) an energization winding on each of said cores, the winding having its end turns positioned at the ends of the respective core and flush with said adjacent surface, the separation width between said core ends and between adjacent cores being thereby predetermined by substantially the thickness of the windings associated therewith.

2. A recording device according to claim 1 wherein the ends of the core windings are brought out to form electrical connections at a surface other than said adjacent surface of the block.

3. A recording device according to claim 1 wherein said cores are constructed of a single piece of magnetizable material.

References Cited

UNITED STATES PATENTS

| | | | |
|---|---|---|---|
| 2,511,230 | 6/1950 | Wald | 336—178 |
| 3,243,519 | 3/1966 | Parstorfer | 340—174.1 |

OTHER REFERENCES

Knowlton, A. E., "Standard Handbook for Electrical Engineers," 9th edition, 1957, McGraw-Hill Co., N.Y., pp. 45, 46, 494.

W. M. Groben et al., Wear Coating for a Tape Head, IBM Technical Disclosure Bulletin, vol. 9, No. 9, p. 1085.

L. J. Poch et al., Magnetic Head, IBM Technical Disclosure Bulletin, vol. 2, No. 1, p. 42.

BERNARD KONICK, Primary Examiner

J. ROSENBLATT, Assistant Examiner

U.S. Cl. X.R.

29—603; 179—100.2; 340—174.1